United States Patent
Pontaoe

(10) Patent No.: US 6,618,910 B1
(45) Date of Patent: Sep. 16, 2003

(54) CORD CLAMP

(75) Inventor: John S. Pontaoe, Chicago, IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 09/686,607

(22) Filed: Oct. 11, 2000

(51) Int. Cl.$^7$ .......................... F16G 11/00; A44B 21/00
(52) U.S. Cl. ................................. 24/115 H; 24/115 R
(58) Field of Search ............................ 24/3.1, 3.4, 3.11, 24/3.12, 3.13, 3.6, 115 R, 115 K, 115 H, 129 R, 136 R, 298

(56) References Cited

U.S. PATENT DOCUMENTS

| | | | | |
|---|---|---|---|---|
| 194,984 A | * | 9/1877 | Bradley ................. 24/265 BC |
| 520,318 A | * | 5/1894 | Knap .......................... 24/319 |
| 1,128,305 A | | 2/1915 | Gammache |
| 1,455,879 A | | 5/1923 | Gronlund |
| 1,529,257 A | | 3/1925 | Lampl |
| 2,159,223 A | | 5/1939 | Okun |
| 2,272,136 A | | 2/1942 | Orech et al. |
| 2,297,661 A | | 9/1942 | Okun |
| 2,631,449 A | | 3/1953 | Protsman |
| 2,877,527 A | * | 3/1959 | Bond ................... 24/129 R X |
| 3,296,669 A | * | 1/1967 | Elder, Jr. .............. 24/129 R X |
| 4,049,357 A | | 9/1977 | Hamisch, Jr. |
| 4,117,998 A | * | 10/1978 | Notoya ................. 24/115 R X |
| 4,143,446 A | * | 3/1979 | Down ....................... 24/115 R |
| 4,379,358 A | | 4/1983 | Wibrow |
| 4,548,201 A | * | 10/1985 | Yoon .................... 24/115 H X |
| 5,208,950 A | * | 5/1993 | Merritt ..................... 24/115 H |
| 5,245,730 A | * | 9/1993 | Martin ................. 24/129 R X |
| 5,283,930 A | * | 2/1994 | Krauss ..................... 24/129 R |
| 5,669,119 A | * | 9/1997 | Seron ................... 24/129 R X |
| 5,671,508 A | | 9/1997 | Murai |
| 6,044,527 A | | 4/2000 | Ishida et al. |
| 6,094,783 A | * | 8/2000 | Parsons ................ 24/129 R X |
| 6,105,218 A | * | 8/2000 | Reckie ......................... 24/518 |
| 6,158,095 A | * | 12/2000 | Lassiter ................ 24/129 R X |
| 6,351,874 B1 | * | 3/2002 | Suggs .................. 24/265 BC |

* cited by examiner

Primary Examiner—Robert J. Sandy
Assistant Examiner—Ruth C. Rodriguez
(74) Attorney, Agent, or Firm—Mark W. Croll; Paul F. Donovan

(57) ABSTRACT

A cord clamp having a housing with first and second matable body portions, first and second side-by-side cord accommodating passages extending at least partially through the housing from both opposite ends thereof. In some embodiments, a plurality of cord retaining teeth protrude into one of the passages, and in some embodiments one or both of the passages are devoid of cord retaining teeth and include a passage constriction for adjustably capturing a corresponding cord portion. A hinge may interconnect the first and second body portions at one end thereof, preferably between the passages.

22 Claims, 3 Drawing Sheets

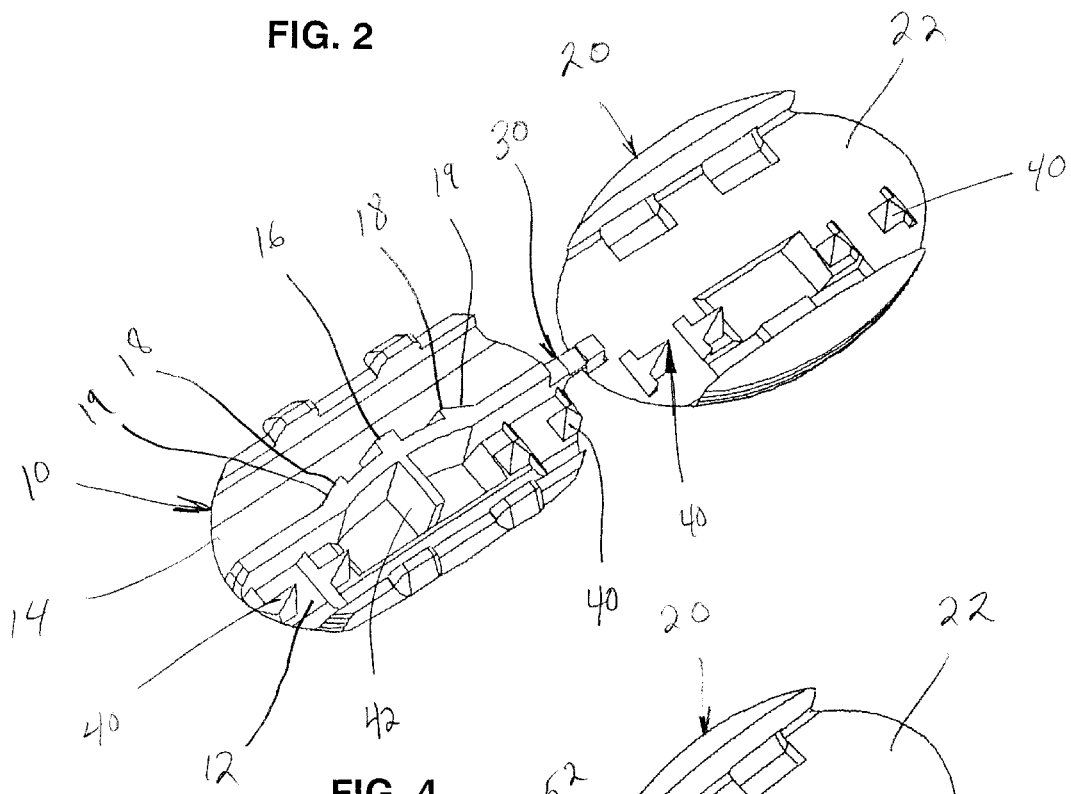
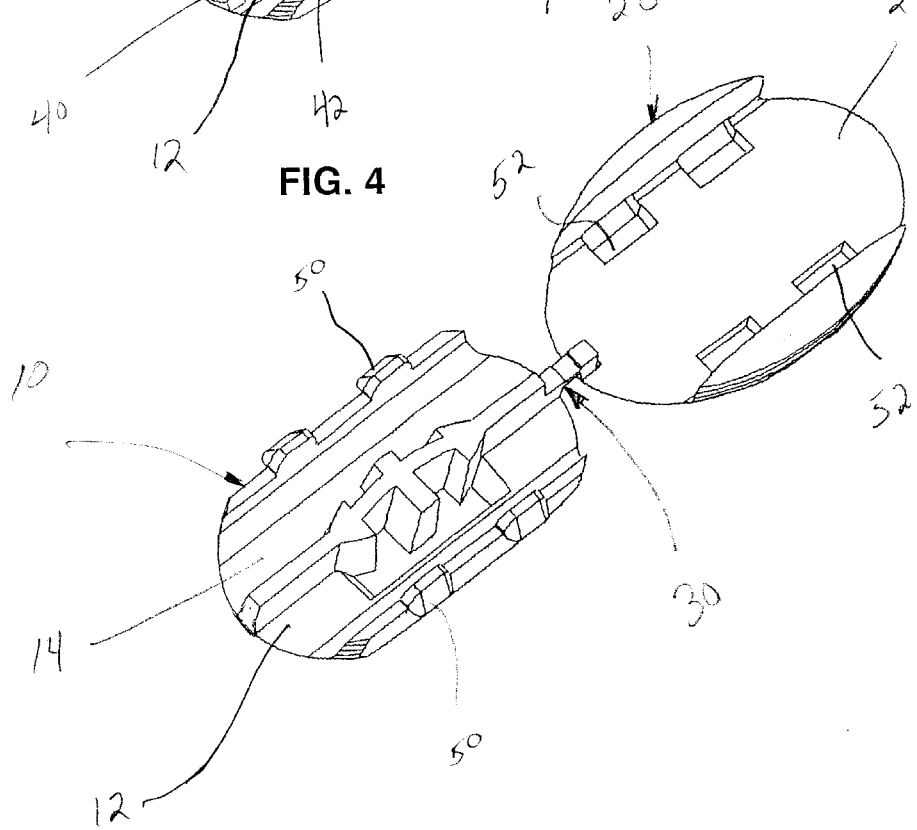

CORD CLAMP

BACKGROUND OF THE INVENTION

The invention relates generally to cord clamps, and more particularly to cord clamps for accommodating multiple cord portions.

U.S. Pat. No. 4,049,357 entitled "Sliding Coupling Device For A Lanyard Or The Like" discloses a known cord clamping device comprising a pair of mated housing portions forming an internal cavity and a pair of side-by-side circular openings disposed on opposite ends thereof through which corresponding cord portions are disposed. In one embodiment, free end portions of the cords are retained in the housing cavity by corresponding knots, and in another embodiment the free cord end portions are crimped together in the cavity.

An object of the present invention is to provide in some embodiments thereof novel cord clamps that overcome problems in and improve upon the prior art.

Another object of the invention is to provide in some embodiments thereof novel cord clamps that are economical.

A further object of the invention is to provide in some embodiments thereof novel cord clamps that are reliable.

Another object of the invention is to provide in some embodiments thereof novel cord clamps that adjustably retain one or more cord portions.

Yet another object of the invention is to provide in some embodiments thereof novel cord clamps that capture multiple cord portions.

Another object of the invention is to provide in some embodiments thereof novel cord clamps that are easy to install and assemble.

Another object of the invention is to provide in some embodiments thereof novel cord clamps that fasten axially aligned free end cord portions.

Another object of the invention is to provide in some embodiments thereof novel cord clamps that fasten substantially axially aligned free end portions of one cord portion and adjustably capture another adjacent cord portion.

Another object of the invention is to provide in some embodiments thereof novel cord clamps that provide side-by-side passages through the clamp for capturing and adjustably retaining corresponding cord portions.

Still another object of the invention is to provide in some embodiments thereof novel cord clamps having housings formed of matable body portions that are hinged together, preferably with a hinge located between adjacent cord passages through the housing.

Yet another object of the invention is to provide in some embodiments thereof novel cord clamps that are ergonomical, for example by providing an effective yet comfortable gripping surface.

It is also an object of the invention to provide in some embodiments thereof novel cord clamps that are less likely to cause interference, for example with outerwear.

A more particular object of the invention is to provide in some embodiments thereof novel cord clamps comprising a housing having first and second mated body portions, first and second generally side-by-side cord accommodating passages at least one of which extends fully through the housing between opposite ends thereof, and a plurality of cord retaining teeth protruding into the first passage, wherein the second passage is devoid of cord retaining teeth.

Another more particular object of the present invention is to provide in some embodiments thereof novel cord clamps comprising a housing formed by first and second matable body portions, first and second side-by-side passages extending fully through the housing between opposite ends thereof, wherein one of the first and second passages has a constricted passage portion.

Still another more particular object of the invention is to provide in some embodiments thereof novel cord clamps comprising a housing of first and second matable body portions, first and second side-by-side passages extending at least partially through the housing from both opposite ends thereof, and a hinge interconnecting the first and second body portions at one end thereof between the first and second passages at the corresponding end of the housing.

These and other objects, aspects, features and advantages of the present invention will become more fully apparent upon careful consideration of the following Detailed Description of the Invention and the accompanying Drawings, which may be disproportionate for ease of understanding, wherein like structure and steps are referenced generally by corresponding numerals and indicators.

BRIEF DESCRIPTION OF THE DRAWINGS

FIG. 2 is an interior view of an exemplary cord clamp.

FIG. 4 is an interior view of another exemplary cord clamp.

DETAILED DESCRIPTION OF THE INVENTION

Figure 1:
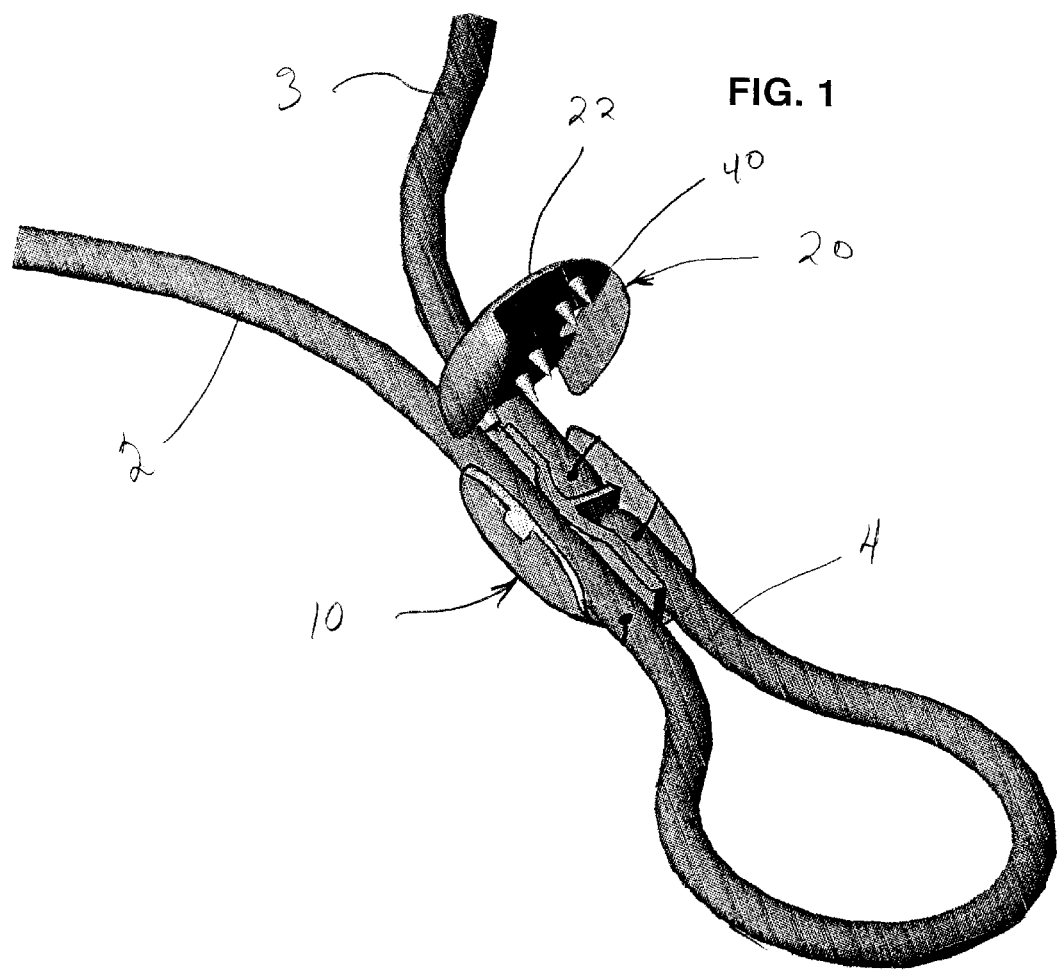
FIG. 1 is a partially assembled cord clamp according to an exemplary embodiment of the invention.

FIG. 1 is an exemplary unassembled cord clamp for clamping plural cord portions 2 and 3, which may be part of the same cord or separate cords.

The cord portions may for example be part of a neck strap, or an eyeglass strap, or a key strap, or a strap on some type of clothing or outwear like waist and back packs, or on one or more cord portions used in many other applications.

The cord clamp comprises generally a housing having first and second matable body portions 10 and 20 which capture cord portions therebetween when mated or assembled.

The exemplary housing includes first and second generally side-by-side cord accommodating passages extending at least partially through the housing from opposite ends thereof. In some embodiments, both passages extend fully through the housing between the opposite ends thereof, and in other embodiments one or more of the passages may be partially or fully obstructed, as discussed further below.

The first and second body portions 10, 20 generally have complimentary shapes that are matably engaged upon assembly thereof with the cord portions therebetween. Cooperating engagement members retain the first and second body portions in the mated configuration, thereby axially fixing or adjustably capturing the cord portions therebetween.

In some embodiments the first and second body portions are hinged together at one end thereof, although in alternative embodiments the first and second body portions may be discrete components without an interconnecting hinge.

Figure 5:
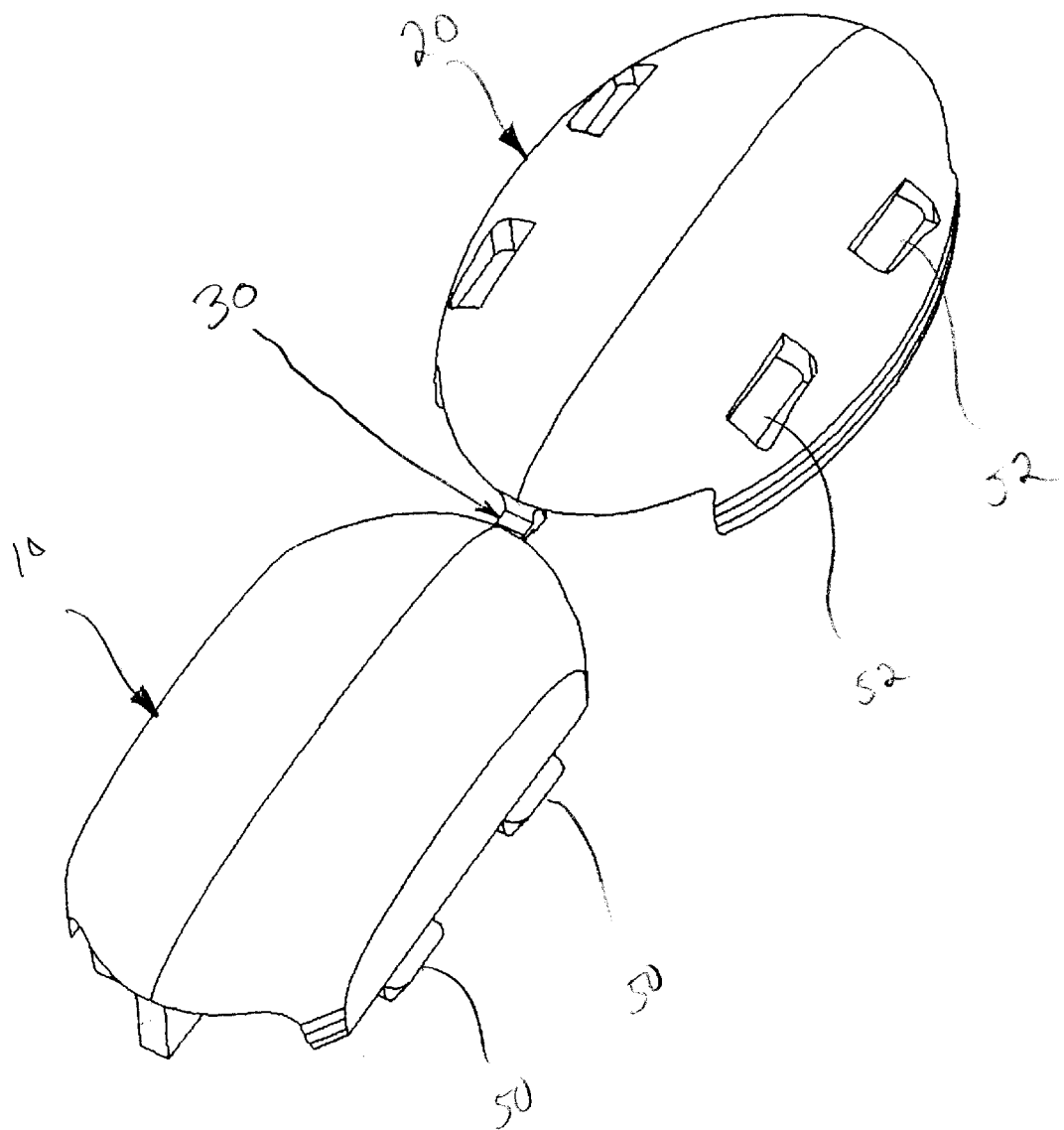
FIG. 5 is an exterior view of an exemplary cord clamp.

In FIGS. 2, 4 and 5, a single hinge 30 interconnects the first and second body portions 10, 20 between the first and second passages of the housing. The first and second body portions and the hinge therebetween may be formed unitarily of a plastic material in a molding operation or by other manufacturing processes.

The cord clamp of the exemplary embodiment has a flattened generally ellipsiodal shape, though not in the strict mathematical sense, with the first and second cord accommodating passages extending along the major axis thereof.

In FIGS. 2 and 4, the first body portion 10 includes first and second open-sided channels 12, 14 therein extending between opposite ends thereof. The channels each partially form a corresponding one of the first and second passages of the housing.

The second body portion 20 includes a cover portion 22 that covers the first and second channels 12, 14 of the first body portion when the first and second body portions are mated, thereby forming the housing passages.

In FIG. 4, the first and second channels 12, 14 and the corresponding passages extend fully through the housing between the opposite ends thereof to accommodate corresponding continuous cord portions, for example the cord portion 2 illustrated in FIG. 1.

In some embodiments, the one or more passages have a cord friction producing constricted portion for adjustably capturing a cord portion therein. In FIGS. 2 and 4, for example, the channel 14 is constricted by a constricting member 16 protruding partially thereacross and ribs 18 protruding into the passage on opposite sides thereof. The ribs 18 each have a beveled edge 19 on a side thereof nearest a corresponding end of the housing, in a substantially mirror imaging configuration. In other embodiments, other cord friction producing configurations may be employed in the channel.

In FIG. 4, both channels 12, 14 include constricted portions therein, whereby the both cord portions captured by the housing are adjustably captured therein. In other embodiments, however, only one of the passages includes a constricted portion, and in still other embodiments one or more of the passages are configured to axially retain the cord.

In another embodiment, a plurality of cord retaining teeth protrude into one or more of the passages to axially retain one or more cord portions disposed therein. In FIG. 1, for example, separate free cord end portions 2 and 3 are disposed in one of the passages, or channels of the first body portion from opposite ends thereof. The teeth retain the cord portions in the housing when the first and second body portions thereof are mated, thereby connecting the free cord end portions 2 and 3, for example to form a closed-loop 4.

Figure 3:
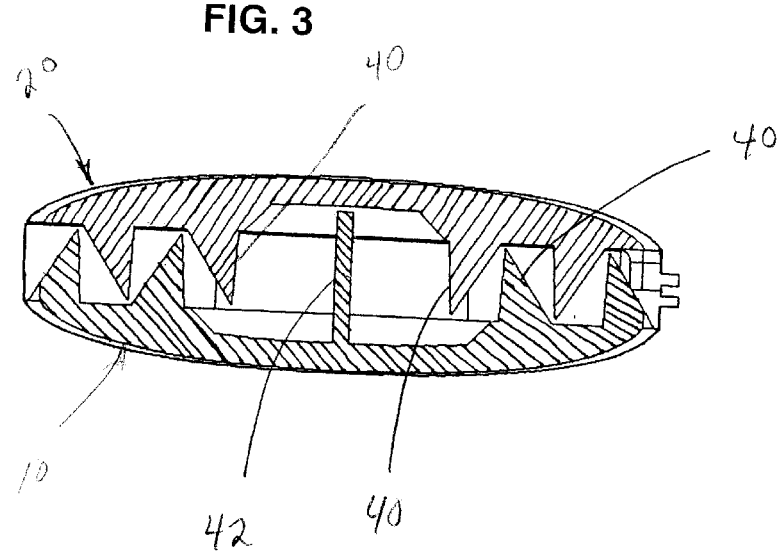
FIG. 3 is a sectional view of an exemplary cord clamp.

In FIGS. 1, 2 and 3, the plurality of cord retaining teeth 40 have pointed tips, which are particularly suitable for penetrating woven the cord materials. In other embodiments however the teeth may have other configurations, which may depend upon the type cord used.

In FIGS. 1 and 2, the plurality of teeth are arranged substantially in a series along the passage between opposite ends of the housing. In FIGS. 2 and 3, the plurality of teeth 40, only some of which are identified with numerals, protrude alternately from the first and second body portions 10, 20. In other embodiments however the teeth protrude from only one of the body portions and not the other.

In FIG. 3, which is a sectional view along a passage having a plurality of teeth, the tips of the teeth are skewed, or converge, toward a medial portion of the housing.

In FIGS. 2 and 3, a wall member 42 protrudes at least partially across the passage, thus providing a stop for cord end portions disposed therein from opposite ends of the housing, wherein the teeth 40 are disposed on opposite sides of the wall member 42.

Generally the first body portion has a first engagement member and the second body portion has a second engagement member cooperatively engageable with each other when the first and second body portions are mated.

In the exemplary embodiment of FIGS. 2, 4 and 5, tabs 50 protrude from opposite sides of the first body portion 10 for engagement with openings 52 in the second body portion 20 when the first and second body portions are mated. In other embodiments, other engagement configurations may be employed to fasten the first and second body portions.

While the foregoing written description of the invention enables one of ordinary skill to make and use what is considered presently to be the best mode thereof, those of ordinary skill will understand and appreciate the existence of variations, combinations, and equivalents of the specific exemplary embodiments herein. The invention is therefore to be limited not by the exemplary embodiments herein, but by all embodiments within the scope and spirit of the appended claims.

What is claimed is:

1. A cord clamp for a cord having a first end, a second end and a continuous cord portion extending therebetween, the cord clamp comprising:

a housing having first and second mated body portions;

first and second generally side-by-side cord accommodating passages, the first passage extending fully through the housing between opposite ends thereof so as to accommodate the continuous cord portion of the cord;

a wall member protruding at least partially across the second passage, the wall member providing a stop for the cord ends of the cord disposed within the second passage from opposite ends of the second passage, such that the first end of the cord is positioned on one side of the wall member and the second end of the cord is positioned on the opposite side of the wall member; and a plurality of cord retaining teeth protruding into the second passage, the first passage being devoid of cord retaining teeth.

2. The cord clamp of claim 1, the plurality of cord retaining teeth having pointed tips and arranged substantially in a series along the second passage between opposite ends of the housing, the plurality of teeth protruding alternately from the first and second body portions, the tips of the teeth converging toward a medial portion of the housing.

3. The cord clamp of claim 1, the first and second body portions hinged together at one end thereof between the first and second passages.

4. The cord clamp of claim 3, the first and second body portions having complementary shapes, the first body portion having a first engagement member and the second body portion having a second engagement member, the first and second engagement members engaged with each other when the first and second body portions are mated.

5. The cord clamp of claim 1, the first passage having a constricted portion.

6. The cord clamp of claim 5, the constricted portion including a plurality of ribs protruding into the first passage.

7. The cord clamp of claim 1, a first rib with a beveled edge protruding into the first passage located toward one end of the housing, a second rib with a second beveled edge protruding into the first passage located toward the opposite end of the housing, the first and second ribs orientated in the first passage to substantially mirror each other.

8. The cord clamp of claim 1, the first body portion having channels extending between opposite ends thereof, and the second body portion including a cover portion covering the channels of the first body portion when the first and second body portions are mated, thereby defining the first and second passages.

9. The cord clamp of claim 1, the housing having a flattened generally ellipsiodal shape with the first and second passages extending along the major axis thereof.

10. A cord clamp comprising:
   a housing formed by first and second matable body portions;
   a wall extending substantially fully through the housing between opposite ends thereof; and
   first and second side-by-side passages extending fully through the housing between the opposite ends thereof and on opposite sides of the wall, each passage accommodating a continuous cord portion;
   wherein each of the first and second passages has a constricted passage portion for adjustably capturing the associated cord portion while the first and second body portions of the housing are mated together so as to be closed, such that even though closed, the associated cord portion can be slid through the housing and adjustably captured therein.

11. The cord clamp of claim 10, the constricted passage portion includes a constricting member protruding partially thereacross and a rib protruding into the passage on opposite sides of the constricting member, each rib having a beveled edge on a side thereof nearest a corresponding end of the housing.

12. The cord clamp of claim 10, the first body portion having first and second open-sided channels therein extending between opposite ends thereof, each channel partially forming a corresponding one of the first and second passages, the second body portion including a cover portion covering the first and second channels of the first body portion when the first and second body portions are mated, a hinge connecting the first and second body portions at one end thereof between the first and second passages of the housing.

13. The cord clamp of claim 12, tabs protruding from opposite sides of the first body portion engaging openings in the second body portion when the first and second body portions are mated.

14. The cord clamp of claim 13, the housing having a flattened generally ellipsiodal shape with the first and second passages extending along a major axis thereof.

15. A cord clamp comprising:
   a housing of first and second matable body portions;
   a wall extending through the housing between opposite ends thereof;
   first and second side-by-side passages extending at least partially through the housing from the opposite ends thereof and on opposite sides of the wall, the first passage accommodating a non-continuous cord portion of a cord, such that opposite, spaced apart ends of the cord are securely captured within the first passage, and the second passage accommodating a continuous cord portion of the cord, the second passage being configured to adjustably capture the continuous cord portion; and
   a hinge extending from the wall to connect the first and second body portions at one end thereof between the first and second passages at the corresponding end of the housing;
   wherein the first body portion has channels extending between opposite ends thereof, and the second body portion includes a cover portion covering the channels of the first body portion when the first and second body portions are mated, thereby defining the first and second passages, and wherein one of the body portions includes tabs protruding from opposite sides thereof to engage openings in the other body portion when the first and second body portions are mated.

16. The cord clamp of claim 15, a plurality of pointed teeth alternately protruding from the first and second body portions into the first passage, a friction generating passage constricting member disposed in the second passage.

17. The cord clamp of claim 15, the housing having a flattened generally ellipsiodal shape with the first and second passages extending along a major axis thereof.

18. The cord clamp of claim 15, one of the first and second passages having a constricted passage portion for adjustably capturing the associated cord portion.

19. A cord comprising:
   a housing having first and second mated body portions;
   first and second generally side-by-side cord accommodating passages, the first passage extending fully through the housing between opposite ends thereof so as to accommodate a continuous cord portion, the first body portion having channels extending between opposite ends thereof, and the second body portion including a cover portion covering the channels of the first body portion when the first and second body portions are mated, thereby defining the first and second passages;
   a wall member protruding at least partially across the second passage, the wall member providing a stop for cord end portions disposed within the second passage from opposite ends of the second passage; and
   a plurality of cord retaining teeth protruding into the second passage, the first passage being devoid of cord retaining teeth, the teeth each having a pointed tip and alternately protruding into the second passage from the first and second body portions on opposite sides of the wall member, the tips of the teeth converging towards the wall member, the first passage including a constricted portion with first and second ribs protruding into the passage, the first and second ribs each having a beveled edge on a corresponding side thereof located nearest a corresponding end of the housing.

20. A cord clamp comprising:
   a housing formed by first and second matable body portions;
   a wall extending substantially fully through the housing between opposite ends thereof; and
   first and second side-by-side passages extending fully through the housing between the opposite ends thereof and on opposite sides of the wall, each passage accommodating a cord portion;
   wherein at least one of the first and second passages has a constricted passage portion that includes a constricting member protruding partially thereacross and a rib protruding into the passage on opposite sides of the constricting member, each rib having a beveled edge on a side thereof nearest a corresponding end of the housing, the constricted passage being adapted for adjustably capturing the associated cord portion while the first and second body portions of the housing are mated together.

21. The cord clamp of claim 20, wherein both the first and second passages of the housing having a constricted portion.

22. The cord clamp of claim 21, the first body portion having first and second open-sided channels therein extending between opposite ends thereof, each channel partially forming a corresponding one of the first and second passages, the second body portion including a cover portion covering the first and second channels of the first body portion when the first and second body portions are mated, a hinge connecting the first and second body portions at one end thereof between the first and second passages of the housing.

* * * * *